United States Patent [19]

Melhorn et al.

[11] 4,242,924

[45] Jan. 6, 1981

[54] TRANSMISSION MECHANISM

[75] Inventors: Barry J. Melhorn; Alex Krulikowski, both of Westland, Mich.

[73] Assignee: Borg-Warner Corporation, Chicago, Ill.

[21] Appl. No.: 944,432

[22] Filed: Sep. 21, 1978

[51] Int. Cl.³ .............................................. F16H 57/10
[52] U.S. Cl. ........................................ 74/759; 74/761; 74/763; 74/765
[58] Field of Search ................ 74/759, 761, 763, 765

[56] References Cited

U.S. PATENT DOCUMENTS

| | | | |
|---|---|---|---|
| 2,764,904 | 10/1956 | Kummich | 74/763 |
| 2,813,437 | 11/1957 | Kelbel et al. | 74/763 X |
| 2,821,869 | 2/1958 | Kelbel | 74/763 |
| 2,884,809 | 5/1959 | Moore | 74/759 X |
| 2,956,448 | 10/1960 | Edsall | 74/765 X |
| 2,990,727 | 7/1961 | Miller | 74/763 X |
| 3,031,901 | 5/1962 | Simpson | 74/761 X |
| 3,103,832 | 9/1963 | Foerster | 74/759 |
| 3,386,314 | 6/1968 | Stockton | 74/765 X |
| 3,483,771 | 12/1969 | Forster et al. | 74/763 X |
| 3,486,398 | 12/1969 | Waclawek | 74/759 X |
| 3,486,399 | 12/1969 | Forster | 74/765 |
| 3,592,082 | 7/1971 | Ott | 74/761 |
| 3,593,599 | 7/1971 | Dach | 74/759 |
| 3,611,835 | 10/1971 | Borman | 74/759 |
| 3,626,788 | 12/1971 | Smalinskas | 74/765 |
| 3,986,413 | 10/1976 | Stockton | 74/762 X |
| 4,086,827 | 5/1978 | Chana | 74/759 |

FOREIGN PATENT DOCUMENTS 2064775  9/1972  Fed. Rep. of Germany ............ 74/763

*Primary Examiner*—Leslie Braun
*Attorney, Agent, or Firm*—James J. Jennings

[57] ABSTRACT

A planetary transmission mechanism comprising two simple planetary gear sets driven by the engine of a vehicle through an input clutch or torque converter and having five friction engaging devices and two one-way engaging devices to establish four forward driving ratios and reverse through the transmission. A center output gear is mounted between the input clutch or torque converter and the planetary gear sets. The friction engaging devices comprising clutches associated with the planetary gear sets are mounted immediately adjacent the gear input elements which they connect. A pair of one-way devices are provided for various of the ratios which have a common outer race member.

6 Claims, 3 Drawing Figures

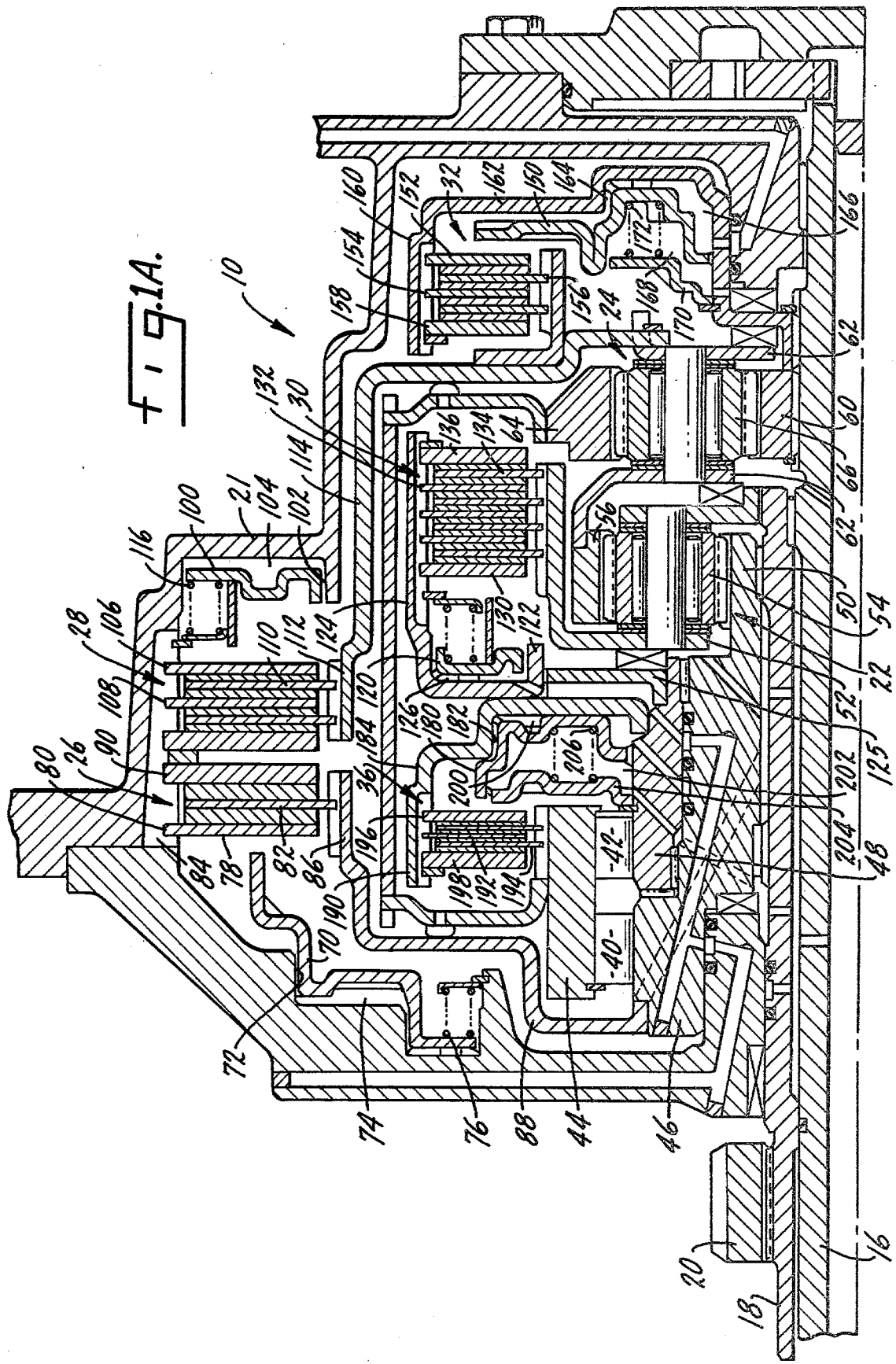

TRANSMISSION MECHANISM

BACKGROUND OF THE INVENTION

It has been known in the prior art to provide four forward driving ratios with a pair of simple planetary gear sets. In the prior art and specifically as shown in U.S. Pat. No. 3,986,413 a solution to providing four forward driving ratios from two simple planetary gear sets is provided. However, with this solution and certain others in the prior art, a split power path is used to the output. This creates complication and expense in that with a pair of input shafts and an output shaft, three concentric shafts are required for the transmission mechanism. In addition, prior solutions utilize brake mechanisms of different diameters, and drum type brakes rather than disc units. These prior solutions can result in transmissions which are difficult to manufacture and expensive in obtaining the four forward driving ratios. In addition, prior application Ser. No. 748,572 filed Dec. 8, 1976 and assigned to the assignee of this application provides a solution but certain of the shifts as for example, the 2-3 shift requires precise timing to provide a smooth shift.

SUMMARY OF THE INVENTION

To obviate the above-mentioned difficulties the transmission disclosed herein provides a four forward speed transmission mechanism easily adapted for front or rear wheel drive where the transmission, engine and driving wheels are all at the same extremity of the vehicle. The present solution includes a single input clutch or in the alternative an input torque converter connected by a single intermediate input shaft to two simple planetary gear sets. Three clutches for the planetary gear set are provided which are mounted immediately adjacent the gear set elements which they drivingly connect. The brake mechanisms for the planetary gear set comprise two disc brake mechanisms of identical diameters, mounted adjacent one another in a location of the casing which minimizes space requirements and maximizes the torque capacity of the brake mechanism.

In addition by having a single input to the pair of simple planetary gear sets from the input clutch or torque converter, and a single output shaft connecting the planetary gear sets and the output gearing, only two concentric shafts are required which results in economy of manufacture over those transmission devices having a split power path requiring a pair of concentric input shafts and a concentric output shaft for a center output, as is normally required in installations where the transmission, engine, and axle driving mechanisms are at the same end of the vehicle.

Further by use of a pair of one-way engaging devices with a common outer race, a simplified way of providing a smooth 2-3 shift is accomplished with a minimum of parts.

BRIEF DESCRIPTION OF THE DRAWINGS

FIG. 1A is a cross-sectional view through a transmission and axle combination embodying the principles of the present invention;

DETAILED DESCRIPTION OF THE INVENTION

Figure 1B:
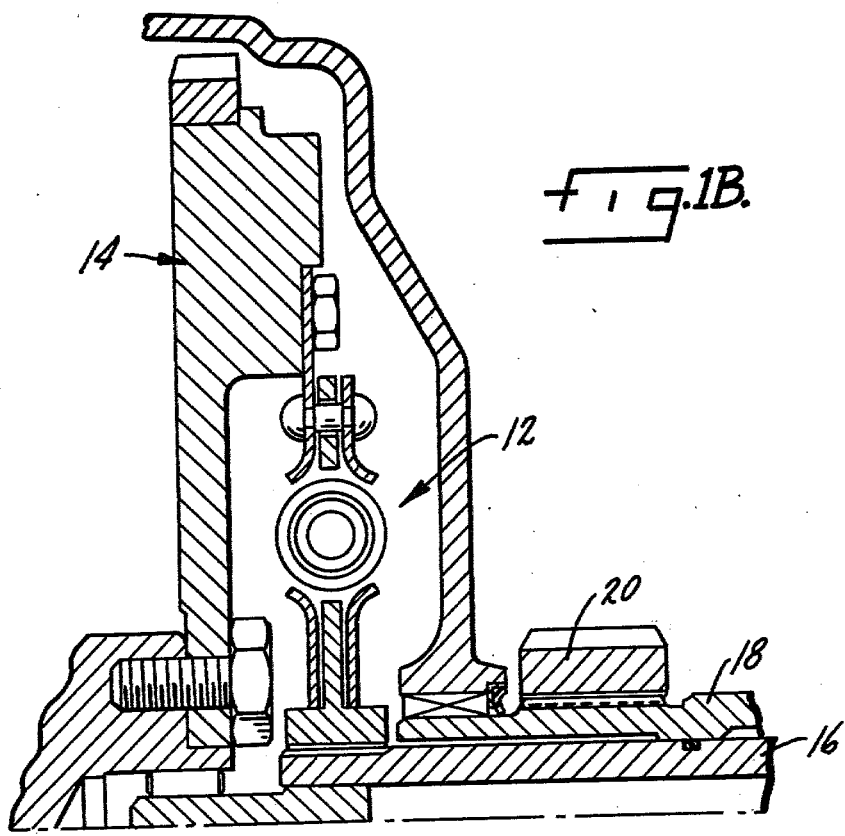
FIG. 1B is a cross-sectional view through a transmission according to FIG. 1A showing an input vibration damper assembly to drive the transmission shown in FIG. 1A.
Figure 2:
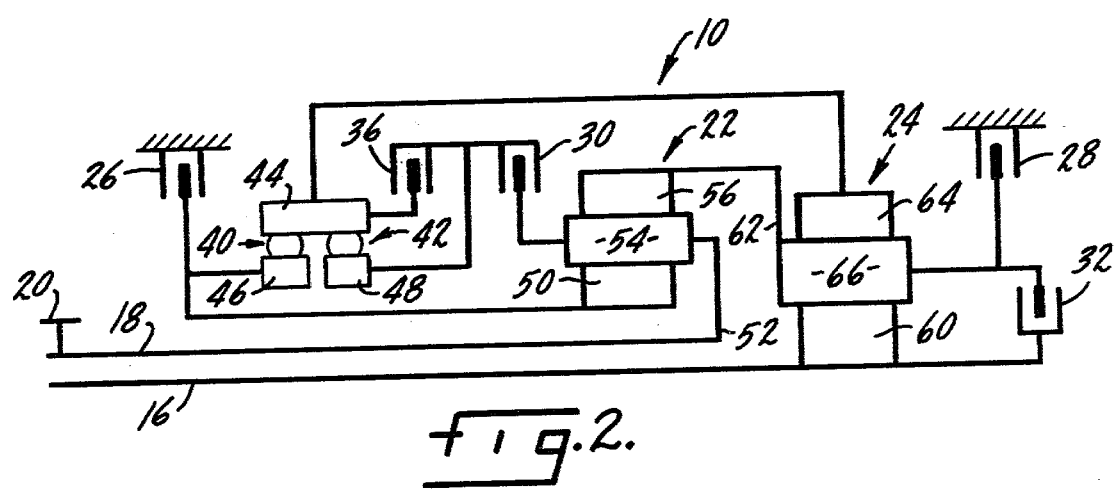
FIG. 2 is a schematic view of the transmission of FIG. 1.

Referring to FIGS. 1A, 1B and 2, there is shown a transmission mechanism 10 of the present invention. The transmission includes as illustrated in FIG. 1B for example, a vibration damper 12, connected to a fly wheel 14 of an engine. The damper 12 is connected to transmit drive from the engine to an input shaft 16. The transmission further includes an output shaft 18 connected to an output gear 20.

The transmission has its main elements mounted in a housing 21, as shown in FIG. 1A. These elements, also shown in simplified form in FIG. 2, include a pair of planetary gear sets 22 and 24, a brake 26, a reverse brake 28, a clutch 30, a clutch 32, and a clutch 36. Each of the clutches and brakes are of the multi-disc friction type, having a series of discs to transmit drive when engaged by application of an apply member actuated by a fluid piston, as will be recited in further detail. In addition, there is provided a pair of one-way clutches 40 and 42, having a common outer race 44. One-way clutch 40 has an inner race member 46 and one-way clutch 42 has an inner race member 48.

Planetary gear set 22 comprises a sun gear 50, a planetary carrier 52 upon which are journalled a plurality of planetary pinion gears 54, and further a ring gear 56 meshing with the planetary pinion gears 54.

Planetary gear set 24 comprises a sun gear 60, a carrier member 62, and a ring gear member 64. Planetary carrier member 62 has journalled thereon a plurality of planetary pinion gears 66 which mesh with sun gear 60 and ring gear 64.

Brake 26, which is the forward brake for the transmission, has a piston 70 (FIG. 1A) formed of sheet metal received in a bore 72 in the housing 21 and forming therewith an apply chamber 74 for fluid pressure. A return spring 76 is provided to return the piston to its disengaged position. When piston 70 is actuated, it moves to the right against an apply member 78 which engages a series of interleaved friction discs 80 and 82. Discs 80 are splined to splines 84 internal of the transmission housing 21 and friction discs 82 are splined to a flange 86 provided on a drum member 88. Drum 88 is secured to inner race member 46 for one-way clutch 40 and to sun gear 50. A reaction member 90 is provided against which discs 80 and 82 are applied. Reaction member 90 is fixed to housing 21.

Reverse brake 28 has a sheet metal piston 100 received in a bore 102 in housing 21 and forming therewith a fluid apply chamber 104. Fluid pressure is adapted to move the piston 100 to the left by means of which it engages an apply member 106 which in turn engages inter-leaved friction discs 108 and 110. Discs 108 are splined to the housing 21 and discs 110 are splined to a flange 112 formed on a drum 114 which is connected to carrier 62 for planetary gear set 24. A return spring 116 is provided for piston 100.

A fluid piston 120 is provided for clutch 30. Piston 120 is received in an annular cylindrical portion 122 of drum 124. Drum 124 is drivingly connected through sheet metal member 125 to inner race 48 for one-way clutch 42. Piston 120 forms with the flange 124 a cylinder 126 adapted to receive fluid pressure to move piston 120 to the right to engage apply member 130 which engages with a series of discs 132 and 134 to engage clutch 30. Discs 132 are splined to flange 124 and discs 134 are splined to carrier 52. A reaction member 136 is provided to receive the reaction against which discs 132 and 134 react when clutch 30 is applied.

A fluid piston 150 is provided to engage clutch 32 and acts against an apply member 152. Apply member 152 engages inter-leaved discs 154 and 156. A reaction member 158 is provided for clutch 32 against which the discs 154 and 156 react when engaged by piston 150. Discs 154 are splined to a flange 160. Flange 160 is connected to input shaft 16 through an axial drum 162. Piston 150 is received within an annular portion 164 of drum 162 and forms therewith a fluid chamber 166 by means of which fluid pressure can be conducted to act on piston 150 and move it to the left as viewed in the drawing to engage clutch 32. A balance chamber 168 is provided inside of an annular portion of piston 150 which is closed by a member 170. The balance chamber receives lubricating fluid pressure and will equalize centrifugally caused pressure in the chamber 166 when clutch 32 is disengaged. The pressure of residual fluid in chamber 166 can inadvertently engage clutch 32 due to centrifugal force, but this is prevented by pressure of the residual fluid in balance chamber 168. A return spring 172 is provided to return the piston 150 when the clutch 32 is released.

A piston 180 is provided for clutch 36. The piston 180 is received in an annular chamber 182 formed in drum 184 which is drivingly connected to inner race 48 of one-way clutch 42. A flange 190 is provided on drum 184. A series of discs 192 and 194 are provided for clutch 36. Discs 192 are splined to flange 190 of and discs 194 are splined to outer race member 44 of both one-way clutches 40 and 42. An apply member 196 is provided which is engaged by piston 180 to in turn engage inter-leaved discs 192 and 194 which react against reaction member 198 to engage clutch 36. Piston 180 forms with the drum 184, a fluid apply chamber 200, wherein pressure can be received to move the piston 180 to the left and engage clutch 36. A balance chamber 202 is provided which is formed internally of piston 180 and enclosed by a member 204. Balance chamber 202 serves to prevent inadvertent engagement of clutch 36 due to centrifugal force acting on residual fluid in chamber 200. A return spring 206 is provided to return piston 180 to the right when clutch 36 is disengaged.

The operation of the transmission mechanism of FIGS. 1A and 1B is as follows. There are several ways in which the transmission 10 can be utilized in a vehicle. As illustrated in FIGS. 1A and 1B, a direct input from the engine through a vibration damper 12 is provided and in this mode the transmission is started in the drive configuration by application of the brake 26 as the starting friction member. Thus, in neutral all friction elements are released and in response to movement of the vehicle accelerator, the starting brake 26 is supplied with fluid to engage the drive for the vehicle. In addition, although not illustrated, it will be obvious that in accordance with well known transmission systems in the prior art, the input shaft 16 can be connected to be driven by the output member of a hydraulic torque converter to be mounted between the transmission 10 and the engine, or further as is shown in applicant's copending application, Ser. No. 748,572, filed Dec. 8, 1976, it can be connected to be driven by a large starting friction clutch member which would replace the vibration damper 12 shown in FIG. 1B. However, the following explanation assumes the operation of the transmission wherein the starting brake 26 is applied gradually to begin driving of the vehicle.

Listed below is a table showing the engagement of the various friction elements for each of the four forward ratios and one reverse ratio when the transmission is in operation (E=engaged, D=disengaged).

|         | Clutch 30 | Clutch 32 | Clutch 36 | Brake 26 | Brake 28 |
|---------|-----------|-----------|-----------|----------|----------|
| Park    | D         | D         | D         | D        | D        |
| Reverse | D         | D         | D         | D        | E        |
| Neutral | D         | D         | D         | D        | D        |
| First   | D         | D         | D         | E        | D        |
| Second  | E         | D         | D*        | E        | D        |
| Third   | E         | E         | D         | E        | D        |
| Fourth  | E         | E         | E         | D        | D        |

*Engaged for Manual "2"

Assuming that the mode of FIG. 1 is to be utilized, the operation of the transmission then is as follows:

In first gear ratio brake 26 is applied. First gear ratio power flow consists of input through input shaft 16 to sun gear 60, through planet gear 66, carrier 62 and ring gear 64. Torque from ring gear 64 goes into one-way clutch outer race 44, through locked one-way clutch 40 and into brake 26. The brake reaction prevents ring gear 64 from rotating. Torque from carrier 62 goes to ring gear 56, through planet 54, carrier 52, and to output shaft 18. The resultant ratio in one example is 4.361 to 1.0 and is considered the low gear ratio.

Second gear for a normal automatic upshift consists of application of brake 26 and clutch 30. Torque is transmitted through input shaft 16 into sun gear 60, planet gear 66, carrier 62, and ring gear 64. From ring gear 64 the torque is transmitted to common outer race 44, through locked one-way clutch 42, through engaged clutch 30 into carrier 52. One-way clutch 40 is free wheeling. Torque from carrier 62 is transmitted to ring gear 56, into planet gear 54, into carrier 52 and sun gear 50. Torque in sun gear 50 is reacted in brake 26. The resultant torque in carrier 52 from ring gear 64 and from carrier 62 combines to form a ratio which in one example is 2.553 to 1.0 and is considered the second gear ratio.

Second gear manual range is used for engine braking. Manual second range consists of application of brake 26, clutch 30 and clutch 36. Input torque flow is through input shaft 16 into sun gear 60, planet 66, carrier 62, and ring gear 64. Torque from ring gear 64 goes into common one-way clutch outer race 44 and clutch 36. From clutch 36 torque is transmitted to clutch 30 and into carrier 52. One-way clutch 42 is essentially by-passed so it cannot free-wheel in a coast mode. Torque from carrier 62 is transmitted to ring gear 56. The resultant ratio is the same as normal automatic second gear discussed above.

The third ratio is acheived by applying clutch 32 and brake 26. During the 2–3 shift, clutch 32 is applied and clutch 30 is left applied. One-way clutch 42 will overrun preventing a transmission lock-up and diminishing the importance of timing in releasing clutch 30 and applying clutch 32. For normal automatic upshifts, clutch 36 is disengaged and has no relationship to the timing of clutch 32 application. The application of clutch 32 locks input shaft 16, sun gear 60, and carrier 62 together which essentially locks gear set 24 into one unit. Input torque is transmitted from carrier 62 into ring gear 56, planet gear 54 and carrier 52. Sun gear 50 is held stationary. The resultant ratio from carrier 52 to output shaft 18 is third gear ratio and in one example is 1.553 to 1.0.

In fourth gear the ratio is always 1 to 1. Brake 26 is released and clutch 36 is applied. Clutch 32 remains applied. Torque from the input shaft into gear set 24 is the same as in third gear. Gear set 24 remains locked. Applying clutch 36 and releasing brake 26 locks gear set 22 also. All elements and gear sets rotate at the same speed. The result is a 1 to 1 or direct ratio drive.

Reverse ratio is accomplished by applying brake 28. All other elements are released. Torque goes through input shaft 16 into sun gear 60, into planetary gear 66 and into ring gear 64. Carrier 62 is held stationary by brake 28. Torque from ring gear 64 goes to common outer race 44 through one-way clutch 40 which is locked and drives sun gear 50. Ring gear 64 rotates in a direction opposite the input shaft direction, thus sun gear 50 rotates opposite the input shaft. Ring gear 56 is held stationary by carrier 62 and brake 28. Carrier 52 is driven in the same direction as sun gear 50 which is opposite the input direction. Thus, reverse ratio is achieved which in one example is 5.08 to 1.0.

From the above, it will be apparent that an extremely compact transmission has been provided particularly adapted for front-wheel drive installations. The transmission utilizes only two simple planetary gear sets, a double one-way clutch, three clutches, and two friction brakes and provides four forward speeds and one reverse speed. In addition, the transmission is adaptable to provide for a starting of the vehicle through application of one of the brake elements to simplify the transmission by eliminating the requirement for an input clutch or torque converter mechanism. Further, by utilization of the double one-way clutch and particularly the one-way clutch 42 which is not disclosed in applicant's copending application, Ser. No. 748,572, filed Dec. 8, 1976, a timing problem on a two-three ratio shift is solved when on the two-three shift clutch 30 is released, and clutch 32 applied. Thus, the 2–3 shift is smooth since the third ratio is established by a one-way clutch take over as known in the prior art. In addition, clutch 36 is provided by means of which the one-way clutch 42 can be bypassed to provide a manual second ratio for a second gear start of the engine and for engine braking. The one-way clutch designed as disclosed and described above is unique in that a common outer race has been utilized for both one-way clutches 40 and 42, with the result of simplification of parts.

We claim:

1. A transmission mechanism for an engine driven vehicle providing a plurality of drive ratios and including a pair of planetary gear sets; an input shaft; said gear sets each having a sun, ring, and planetary carrier element, each planetary carrier element having a plurality of pinion gears journalled thereon, said pinion gears meshing with said sun and ring elements; said input shaft being connected to an element of one of said planetary sets; clutch means engageable to connect said input shaft to another element of said one planetary set, thereby locking up said one planetary gear set when engaged; second clutch means engageable to connect an element of each of said gear sets together; separate brake means for an element of each of said gear sets; an output shaft connected to one of said elements of the other gear set such that by selective engagement of said clutch and brake means said plurality of ratios may be established through said transmission; a pair of one-way engaging devices having a common outer race connected to an element of said one gear set, said devices having one inner race being connectable to one of said brake mechanisms and another inner race being connectable to an element of said other gear set, whereby said devices can at times connect the last-mentioned element of said one gear set to said brake and at times connect same to an element of said other gear set.

2. A transmission mechanism for an engine driven vehicle providing a plurality of drive ratios and including a pair of planetary gear sets; an input shaft; said gear sets each having a sun, ring, and planetary carrier element, each planetary carrier element having a plurality of pinion gears journalled thereon, said pinion gears meshing with said sun and ring elements; said input shaft being connected to an element of one of said planetary sets; clutch means engageable to connect said input shaft to another element of said one planetary set, thereby locking up said one planetary gear set when engaged; second clutch means engageable to connect an element of each of said gear sets together; separate brake means for an element of each of said gear sets; an output shaft connected to one of said elements of the other gear set such that by selective engagement of said clutch and brake means said plurality of ratios may be established through said transmission; a pair of one-way engaging devices having a common outer race connected to an element of said one gear set, said devices having one inner race being connectable to one of said brake mechanisms and another inner race being connectable to an element of said other gear set, whereby said devices can at times connect the last-mentioned element of said one gear set to said brake and at times connect same to an element of said other gear set, wherein said common outer race is connected to the ring element of said one gear set, one of said inner races is connected to a brake means and also connected to the sun element of said other gear set, and the other inner race is connectable to the carrier element of said other gear set.

3. A mechanism as in claim 1, wherein a third clutch means is provided between said carrier element of said other gear set and one of said inner races.

4. A transmission mechanism for an engine driven vehicle having a plurality of forward drive ratios and including a pair of planetary gear sets; an input shaft; said gear sets each having a sun gear element, a ring gear element, and a planetary carrier element having pinion gears meshing with said sun and ring gears; said input shaft being connected to a sun gear for one of said planetary sets; clutch means engageable to connect said input shaft to said planetary carrier for said one planetary set, thereby locking up said one planetary gear set when engaged; second clutch means engageable to connect an element of each of said gear sets together; a separate brake means for an element of each of said gear sets; an output shaft connected to the carrier element of the other gear set, such that by selective engagement of said clutch and brake means said plurality of ratios may be established through said transmission; a pair of one-way engaging devices having a common outer race connected to the ring gear of said one gear set, an inner race for one of the devices connected to one of said brake means and an inner race for the other of the devices connectable to the carrier element of said other gear set, whereby said devices can at times connect said ring gear to said brake and at times connect said ring gear to the carrier element of said other gear set.

5. A transmission as in claim 4, wherein said one brake means is connected to the sun gear of said other gear set.

6. A transmission as in claim 5, wherein a third clutch means is provided and is engageable to connect one of said inner races to said carrier for said other gear set.

* * * * *